US012578433B2

(12) United States Patent
Yautz et al.

(10) Patent No.: US 12,578,433 B2
(45) Date of Patent: Mar. 17, 2026

(54) HEAT TRANSFER LIGHT DETECTION AND RANGING DEVICE

(71) Applicant: LG INNOTEK CO., LTD., Seoul (KR)

(72) Inventors: Dustin Ryan Yautz, Wexford, PA (US); Chris J. Trowbridge, Plainsboro, NJ (US)

(73) Assignee: LG INNOTEK CO., LTD., Seoul (KR)

( * ) Notice: Subject to any disclaimer, the term of this patent is extended or adjusted under 35 U.S.C. 154(b) by 1017 days.

(21) Appl. No.: 17/076,113

(22) Filed: Oct. 21, 2020

(65) Prior Publication Data

US 2022/0120862 A1    Apr. 21, 2022

(51) Int. Cl.
  *G01S 7/481*        (2006.01)
  *G01F 5/00*         (2006.01)
        (Continued)

(52) U.S. Cl.
  CPC ............ *G01S 7/4813* (2013.01); *G01F 5/005* (2013.01); *G01S 7/4817* (2013.01); *G01S 7/497* (2013.01); *G01S 17/87* (2013.01)

(58) Field of Classification Search
  CPC ....... G01S 7/4813; G01S 7/4817; G01F 5/005
  See application file for complete search history.

(56) References Cited

U.S. PATENT DOCUMENTS 5,231,401 A    7/1993  Kaman et al.
6,985,508 B2   1/2006  Knowles et al.
        (Continued)

FOREIGN PATENT DOCUMENTS

CN         103608696 A       2/2014
DE      202018001360 U1 *   6/2018
              (Continued)

OTHER PUBLICATIONS

Machine translation of DE-202018001360-U1 (Year: 2018).*
              (Continued)

*Primary Examiner* — Yuqing Xiao
*Assistant Examiner* — Zhengqing Qi
(74) *Attorney, Agent, or Firm* — Birch, Stewart, Kolasch & Birch, LLP

(57)                    ABSTRACT

Devices, systems, and methods are provided for improved heat transfer LIDAR. A LIDAR device may comprise a LIDAR housing configured to attach to a vehicle to detect one or more objects in the field of view of the LIDAR device, wherein the LIDAR housing encloses one or more gases, wherein the one or more gases have a characteristic of being more thermal conductive than air. The LIDAR device may comprise one or more windows allowing light signals to pass through, wherein the one or more windows are attached to one or more walls of the LIDAR housing. The LIDAR device may comprise a rotating platform situated inside the LIDAR housing and configured to rotate around a center axis relative to the LIDAR housing. The LIDAR device may comprise one or more light signal transmitters configured to transmit first light signals through the one or more windows. The LIDAR device may comprise one or more light signal receivers configured to detect second light signals reflected by the one or more objects towards the LIDAR device.

21 Claims, 6 Drawing Sheets

(51) Int. Cl.
  *G01S 7/497* (2006.01)
  *G01S 17/87* (2020.01)

(56) References Cited

U.S. PATENT DOCUMENTS

| | | | |
|---|---|---|---|
| 8,157,205 B2 | 4/2012 | McWhirk | |
| 10,197,669 B2 | 2/2019 | Hall et al. | |
| 10,768,063 B1 | 9/2020 | Diehl et al. | |
| 2004/0051984 A1 | 3/2004 | Oshino et al. | |
| 2007/0267188 A1 | 11/2007 | Di Stefano et al. | |
| 2008/0188011 A1 | 8/2008 | Henley | |
| 2011/0228275 A1* | 9/2011 | Xia | G01N 21/77 |
| | | | 977/773 |
| 2014/0111812 A1* | 4/2014 | Baeg | G01S 17/87 |
| | | | 356/610 |
| 2016/0254642 A1* | 9/2016 | Takigawa | H01S 5/02469 |
| | | | 372/34 |
| 2018/0031705 A1* | 2/2018 | Haines | G01S 17/42 |
| 2018/0109061 A1* | 4/2018 | Pardhan | H05K 7/2039 |
| 2018/0136321 A1 | 5/2018 | Verghese et al. | |
| 2018/0164439 A1 | 6/2018 | Droz et al. | |
| 2018/0188359 A1* | 7/2018 | Droz | G05D 1/247 |
| 2019/0154803 A1 | 5/2019 | Eichenholz | |
| 2020/0064476 A1 | 2/2020 | Raring et al. | |

FOREIGN PATENT DOCUMENTS

| | | | | |
|---|---|---|---|---|
| DE | 102018222449 A1 * | 6/2020 | ......... | H01L 31/0203 |
| EP | 3722862 A1 | 10/2020 | | |

OTHER PUBLICATIONS

F.W. Giacobbe, "Heat transfer capability of selected binary gaseous mixtures relative to helium and hydrogen," Applied Thermal Engineering, vol. 18, Issues 3-4, Mar.-Apr. 1998, pp. 199-206. (Year: 1998).*
Machine translation of DE102018222449A1 (Year: 2020).*
Wilson et al. "Design and Vehicle Integration Challenges for Autonomous Vehicle LIDARs", White Paper, Oct. 22, 2018, pp. 1-10, Siemens PLM Software, Plano, TX, United States.
Pouliot et al. "LineScout Power Line Robot: Characterization of a UTM-30LX LiDAR System for Obstacle Detection", Oct. 7-12, 2012, 8 pages, IEEE/RSJ International Conference on Intelligent Robots and Systems, Vilamoura, Algarve, Portugal.
Mangognia, Anthony. "Helium Resonance Fluorescence LiDAR", May 12, 2015, pp. 1-60, University of Illinois at Urbana-Champaign: Electrical & Computer Engineering, Urbana, IL, United States.
International Search Report and Written Opinion of PCT/US2021/055520 mailed Feb. 11, 2022, 7 pages.

* cited by examiner

400

402

Ambient

Ambient

Heat Source

Heat Source

Rotating Platform

425b

425a

423b

423a

420

Ambient

HEAT TRANSFER LIGHT DETECTION AND RANGING DEVICE

TECHNICAL FIELD

This disclosure generally relates to systems and methods for an improved heat transfer light detection and ranging (LIDAR) device.

BACKGROUND

Some vehicles are equipped with a sensor system to collect data relating to the current and developing state of the vehicle's surroundings. The proper performance of a vehicle depends on the accuracy data collected by the sensors in the sensor system. The sensor system may comprise visual spectrum cameras, laser-ranging devices (LIDARs), thermal sensors, or other types of sensors. The sensor system enables a vehicle to detect objects and obstacles in the vicinity of the vehicle and tracks the velocity and direction of pedestrians, other vehicles, traffic lights, or similar objects in the environment around the vehicle. However, these sensors may generate heat as they operate. Excessive heat may cause some of the sensors to operate below a certain threshold. Therefore, there is a need to enhance heat transfer within these sensors to ensure that heat does not undermine the performance of the sensor system.

Figure 1:
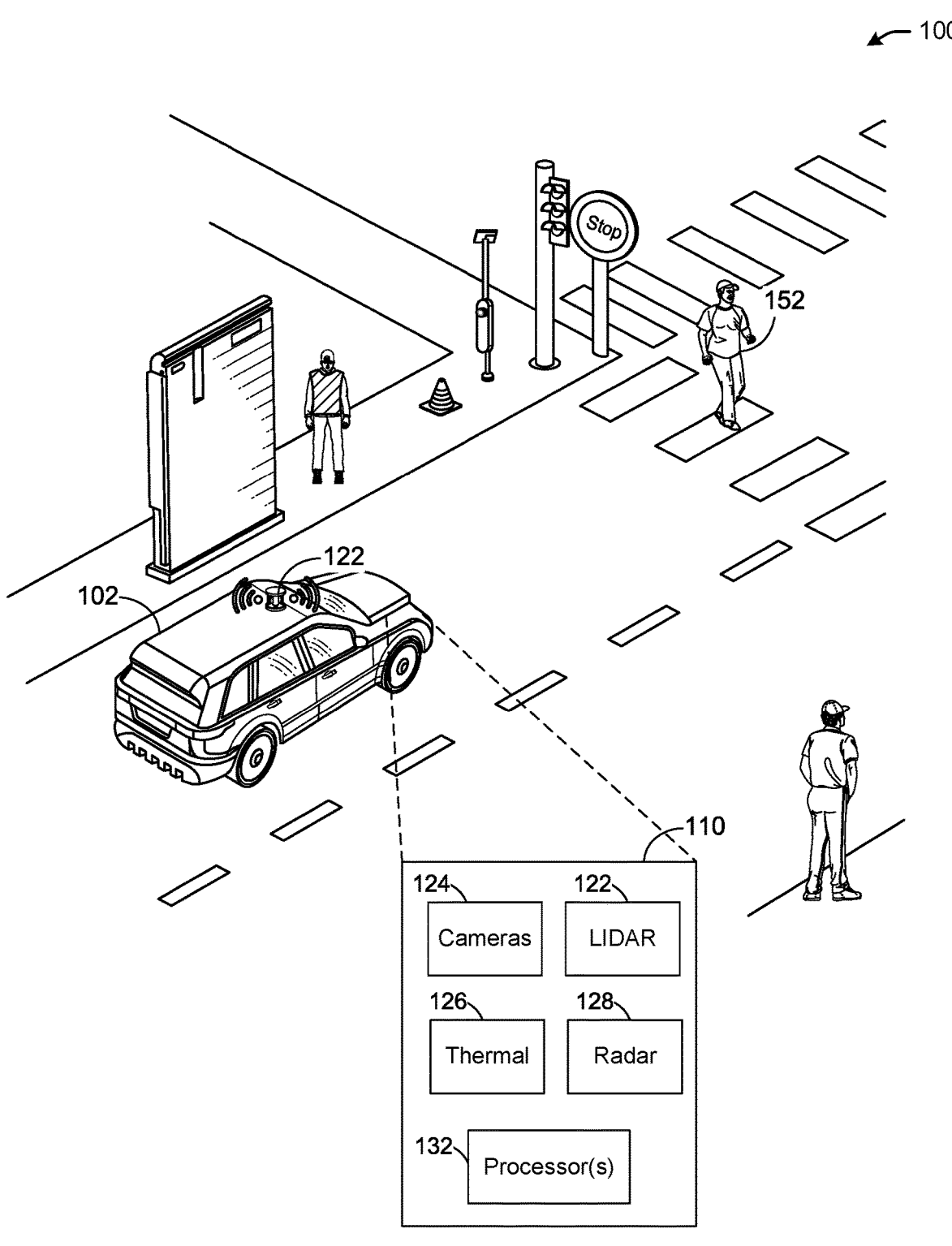
FIG. 1 illustrates an example environment of a vehicle, in accordance with one or more example embodiments of the present disclosure.

Certain implementations will now be described more fully below with reference to the accompanying drawings, in which various implementations and/or aspects are shown. However, various aspects may be implemented in many different forms and should not be construed as limited to the implementations set forth herein; rather, these implementations are provided so that this disclosure will be thorough and complete, and will fully convey the scope of the disclosure to those skilled in the art. Like numbers in the figures refer to like elements throughout. Hence, if a feature is used across several drawings, the number used to identify the feature in the drawing where the feature first appeared will be used in later drawings.

DETAILED DESCRIPTION

Sensors may be located at various positions on an autonomous vehicle. These sensors may include LIDAR devices, stereo cameras, radar sensors, thermal sensors, or other sensors attached to an autonomous vehicle. These sensors may be originally used in a lab environment in order to perform high precision analyses of their performance under certain conditions. Autonomous vehicles may be driven in the real world and rely on the attached sensors to perform to a certain performance level under environmental factors. As the autonomous vehicles are driven in the real world, the sensors may be exposed to environmental factors, such as heat, which may add to the heat generated by the sensors themselves during operations. One example of these sensors is a LIDAR device. A LIDAR device may help determine a distance to an object in the field of view of the LIDAR by scanning the vicinity of the vehicle and based on the distance, the LIDAR device may generate a three-dimensional depiction of the object. The LIDAR may rotate while sending light signals that get reflected by the object. The LIDAR may estimate a distance of the object based on these light signals. The LIDAR may comprise one or more lasers that emit light signals while the LIDAR device rotates at a certain rate.

Example embodiments described herein provide certain systems, methods, and devices for improved heat transfer LIDAR.

In one or more embodiments, an improved heat transfer LIDAR system may facilitate using a rotating LIDAR device comprising a LIDAR housing. The LIDAR device may require a low friction bearing solution in order to maintain angular velocity and azimuthal location accuracy. A spindle placed at the center of the LIDAR housing may rotate with minimal friction within the housing. The spindle may be a rotating platform that attaches to one or more lasers and receivers that transmit light beams and receives reflected light beams back. As the number of lasers increases, the heat generated in the rotating platform increases. Because of the nature of the fact that the rotating platform is rotating, a small contact area at the rotational contact may need to be small in order to minimize friction. Increased friction increases the amount of power required to rotate the rotating platform and further increases the probability that small changes in friction would result in significant changes in angular velocity and therefore azimuthal positioning accuracy. Increased friction not only consumes more power, but also generates additional heat, that must also be shed by the LIDAR housing, in order to maintain a certain level of performance.

In one or more embodiments, an improved heat transfer LIDAR system may facilitate a mechanism to mitigate increased heat generated by the rotation of the rotating platform. The housing of the LIDAR device may comprise one or more lenses that allow light beams to go through as the rotating platform rotates and while the laser transmitters are transmitting light signals towards an object in the field of view of the LIDAR device. Typically, the LIDAR housing encloses air that separates the walls of the housing and the rotating platform that comprises the transmitters and the receivers. As the rotating platform rotates, heat may be generated that may need to be transferred from the rotating platform through the air and into the LIDAR housing before getting exposed to the ambient temperature. Further, the heat may be difficult to remove through the small contact area of the bearing because of the size of this contact area. Some heat may still transfer from the bearing to the housing walls however that is not enough considering the small contact area. The transmitters and receivers may be considered as heat sources because of the light beams being transmitted and received at a certain refresh rate, which is a rate at which the LIDAR device scans its surrounding based on the field of view. Typically, within the LIDAR enclosure (housing), the heat radiates from the heat source (e.g., the lasers (e.g., transmitters) and receivers)) through the air that is surrounding the heat source within the enclosure. The heat may have to conduct from the heat source into the air and then from the air into the housing while before exiting the LIDAR enclosure. However, air is not a good conductor of heat. Because of that, the heat source may become very hot as it tries to radiate the heat through the air to reach the walls of the LIDAR enclosure. Although air can be blown at the LIDAR enclosure from the outside, this may not help radiate the heat from the heat source to the outside of the LIDAR enclosure because the air is not a good conductor of heat. The convective heat transfer of the outside air will quickly become limited by the thermal resistances in between the heat source and the housing. Primary contributors of thermal resistance between the heat source(s) and housing is the convection and conduction through the internal gas within the LIDAR, typically the ambient air that was sealed inside at the time of manufacture.

In one or more embodiments, an improved heat transfer LIDAR system may facilitate that the heat transfer mechanism may comprise using at least one gas that replaces the air within the LIDAR housing between the rotation platform (comprising the transmitters and receivers) and the walls of the LIDAR housing. In the case where the LIDAR device was not a rotating LIDAR device, a primary heat transfer mechanism may comprise using a heatsink configured to pull the heat out of the LIDAR housing. But because of the nature of the rotating LIDAR device and because of the need to have a small contact area, there is a need for an efficient heat transfer mechanism to pull heat from the heat source(s), through the surrounding gas.

In one or more embodiments, an improved heat transfer LIDAR system may facilitate that the gas used inside the LIDAR housing may replace the air that is typically found in that LIDAR housing. The gas may be selected to have a better heat conductivity than the air inside the enclosure. For example, looking at helium, it has better thermal conductivity than air. Based on measurements, air has about 0.026 W/mK (at 300K) of thermal conductivity, while helium has about 0.151 W/mK (at 300K) of thermal conductivity. In some embodiments, a mixture of gases may be used to replace the air within the enclosure. This mixture may be based on a ratio that results in one or more benefits. For example, a benefit may be to increase thermal conductivity. Another benefit may be to increase optical clarity such that the light signals that are being transmitted from a transmitter (e.g., a laser) through the lens on the LIDAR enclosure may result in better optical clarity on both the transmitter side and the receiver side. Another benefit may be that a second gas may be used to make a first gas less reactive within the enclosure. In one or more embodiments, an improved heat transfer LIDAR system may facilitate using only helium inside the LIDAR enclosure. However, since there may be impurities, helium may be present with another gas associated with that impurity. Therefore, indicating that only helium is used inside the LIDAR enclosure may result in a percentage of the helium gas within the enclosure to be approximately 100% but due to impurities that may be present, that percentage is approximated. In cases where helium can be pure, the heat transfer mechanism may facilitate, in some scenarios, using all helium. It should be understood that although helium, hydrogen, and/or impurities, may be present, all of these may be classified as gases. That is having Helium with some impurities may be considered as having a first gas and a second gas in the mixture. These gases may be used as a mixture within the LIDAR enclosure, other percentages and ratios of one or more gases may be used within the LIDAR enclosure in order to increase the heat conductivity within the mixture to allow heat to transfer from the heat source through the mixture to reach the walls of the LIDAR enclosure before radiating to the outside of the LIDAR enclosure.

In one or more embodiments, an improved heat transfer LIDAR system may facilitate that the LIDAR housing may have a mechanism to replace the air inside the LIDAR housing with one or more gases. For example, the LIDAR housing may include an intake that is used to push, for example, helium or other gases into the LIDAR enclosure. The LIDAR housing may also have a relief valve that allows air to exit while helium or other gases are injected through the intake valve. For example, the LIDAR housing may be attached to a pump to pull the interior down to a low-pressure state before allowing helium or other gasses to fill the voids. For example, the LIDAR housing may be designed with inlet and outlet ports, where the ports are located to take advantage of the differences in mass of the air and the heat transfer gas. Orienting the outlet and LIDAR such that helium, for example, would be allowed to flow to the highest point, pushing the air out of the outlet at the lowest point.

In one or more embodiments, an improved heat transfer LIDAR system may include one or more sensors configured to measure and monitor heat within the LIDAR enclosure. Some of these sensors may also measure and monitor the pressure within the LIDAR enclosure. For example, monitoring the pressure within the LIDAR enclosure may determine whether the concentration of the various gases has changed over time due to leakage. Although the LIDAR enclosure is built to ensure minimal to no leakage occurs, there may be situations where some leaking occurs over time. In that case, it may be beneficial to monitor the gas within the LIDAR enclosure to ensure the mixture is still operating two have a high thermal conductivity compared to pressure threshold, volume threshold, concentration thresholds, etc. It is understood that the above descriptions are for purposes of illustration and are not meant to be limiting.

The above descriptions are for purposes of illustration and are not meant to be limiting. Numerous other examples, configurations, processes, etc., may exist, some of which are described in greater detail below. Example embodiments will now be described with reference to the accompanying figures.

FIG. 1 illustrates example environment 100 of a vehicle 102, in accordance with one or more example embodiments of the present disclosure.

Referring to FIG. 1, there is shown a vehicle 102 having a sensor system 110 for a plurality of cameras, emitters, and sensors. The sensor system 110 may be connected to the vehicle 102 at various locations on the vehicle. The sensor system 110 may include cameras such as stereo cameras that may capture images of objects (e.g., pedestrian 152) in the vicinity and around the vehicle 102. Other emitters and sensors in the sensor system 110 may transmit and/or receive one or more signals in order to detect and/or capture information associated with objects in the vicinity and around the vehicle 102. For example, a LIDAR device may transmit LIDAR signals (e.g., light or an electromagnetic wave), a radar uses radio waves in order to determine distances between the vehicle and objects in the vicinity of the vehicle, and a thermal sensor may capture temperature (e.g., based on an emitted and detected infrared signal or other laser signals).

In one or more embodiments, the sensor system 110 may include LIDAR device 122. Some examples of a LIDAR such as Geiger mode LIDAR, ground-based LIDAR, large footprint LIDAR, small footprint LIDAR, or the like. The sensor system 110 may include cameras 124 such as stereo cameras that may capture images in the vicinity of the vehicle 102. The sensor system 110 may include a thermal sensor 126, such as thermistors, resistance temperature detectors, thermocouples, semiconductors, or the like. Further, the sensor system may include a radar 128, which may be any radar that uses radio waves to capture data from objects surrounding the vehicle 102. The sensor system 110 may also include one or more processors 132. The one or more processors 132 may control the transmission and reception of signals using the LIDAR 122, the cameras 124, the thermal sensor 126, and the radar 128. The various sensors of the sensor system 110, when calibrated correctly, should indicate a proper distance and shape of pedestrian 152. However, the vehicle 102 may be subjected to environmental conditions such as vibration, thermal shock, or similar conditions. Under such conditions, the various sensors of the sensor system 110 may fall out of alignment. This would result in the data received from these various sensors to be unreliable when processed by processors 132.

In one or more embodiments, the vehicle 102 may use the LIDAR device 122, shown to be placed on top of the vehicle 102. The LIDAR device 122 may comprise a LIDAR housing that encloses one or more components of the LIDAR device 122. The LIDAR device 122 in this example is shown to be on top of vehicle 102, but, other placements of the LIDAR device 122 may be envisioned. The LIDAR housing of LIDAR device 122 may include a rotating platform that is capable of rotating. This rotating platform may be attached to one or more transmitters and receivers to transmit and receive light signals as the LIDAR device 122 rotates. As objects become in the field of view of the LIDAR device 122, the light beams are transmitted by the one or more transmitters may hit objects and may reflect back towards the LIDAR device 122 such that these reflected light beams may be registered and detected by the one or more receivers of the LIDAR device 122. Because the rotating platform is rotating, a small contact area at the rotational contact may need to be small in order to minimize friction. Increased friction increases the amount of power required to rotate the rotating platform and further increases the probability that small changes in friction would result in significant changes in angular velocity and therefore azimuthal positioning accuracy. Increased friction not only consumes more power, but also generates additional heat, that must also be shed by the LIDAR housing, in order to maintain a certain level of performance.

In one or more embodiments, the vehicle 102 may employ a mechanism to mitigate increased heat generated by the rotation of the rotating platform of the LIDAR device 122. The housing of the LIDAR device 122 may comprise one or more windows that allow light beams to go through as the rotating platform rotates and while the laser transmitters are transmitting light signals towards an object in the field of view of the LIDAR device 110. Typically, the LIDAR housing encloses air that separates the walls of the housing and the rotating platform that comprises the transmitters and the receivers. As the rotating platform rotates, heat may be generated that may need to be transferred from the rotating platform through air and into the LIDAR housing before getting exposed to the ambient temperature. Further, the heat may be difficult to remove through the small contact area of the bearing because of the size of this contact area. Some heat may still transfer from the bearing to the housing walls. However, that may not be enough considering the small contact area. The transmitters and receivers may be considered as heat sources because of the light beams being transmitted and received at a rate at which the LIDAR device 122 scans its surrounding based on the field of view. Typically, within the LIDAR enclosure, the heat radiates from the heat source (e.g., the lasers (e.g., transmitters) and receivers)) through the air that is surrounding the heat source within the enclosure. The heat may have to conduct from the heat source into the air and then from the air into the housing while before exiting the LIDAR enclosure. However, air is not a good conductor of heat. Because of that, the heat source may become very hot as it tries to radiate the heat through the air to reach the walls of the LIDAR enclosure. Although air can be blown at the LIDAR enclosure from the outside, this may not help radiate the heat from the heat source to the outside of the LIDAR enclosure because the air is not a good conductor of heat. The convective heat transfer of the outside air will quickly become limited by the thermal resistances in between the heat source and the housing. Primary contributors of thermal resistance between the heat source(s) and housing is the convection and conduction through the internal gas within the LIDAR, typically the ambient air that was sealed inside at the time of manufacture.

In one or more embodiments, the LIDAR device 122 may be filled with one or more gases inside the LIDAR housing to replace the air that is typically found in that LIDAR housing. The one or more gases may be selected to have a better heat conductivity than the air inside the enclosure. For example, looking at helium, it has better thermal conductivity than air. In some embodiments, a mixture of gases may be used to replace the air within the enclosure. This mixture may be based on a ratio that results in one or more benefits. For example, a benefit may be to increase thermal conductivity. Another benefit may be to increase optical clarity such that the light signals that are being transmitted from a transmitter (e.g., a laser) through the lens on the LIDAR enclosure may result in better optical clarity on both the transmitter side and the receiver side. Another benefit may be that a second gas may be used to make a first gas less reactive within the enclosure. For example, hydrogen may be used with or without helium in the enclosure but because hydrogen is reactive, it may be beneficial to introduce a second gas in order to make hydrogen within the enclosure to be less reactive.

It is understood that the above descriptions are for purposes of illustration and are not meant to be limiting.

Figure 2:
FIG. 2 depicts an illustrative schematic diagram for an improved heat transfer LIDAR device, in accordance with one or more example embodiments of the present disclosure.
Figure 2:
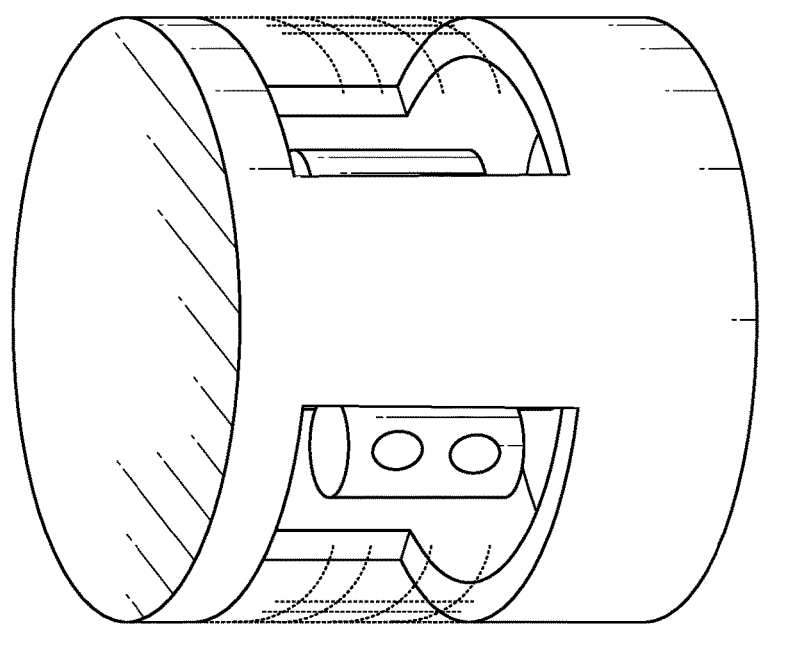

FIG. 2 depicts an illustrative schematic diagram for improved heat transfer LIDAR device, in accordance with one or more example embodiments of the present disclosure.

Referring to FIG. 2, there is shown a LIDAR device 200. A lidar device is an example of sensors that may be used on an autonomous vehicle. An autonomous vehicle may depend on telemetry data captured from the vicinity of the sensors. Other than LIDAR devices, there are stereo cameras, radar sensors, thermal sensors, or other sensors that may be attached to an autonomous vehicle. As the autonomous vehicles are driven in the real world, the sensors may be exposed to environmental factors, such as heat, which may add to the heat generated by the sensors themselves during operations. LIDAR is the technology of measuring target range using reflected light. LIDAR uses may include a class of LIDAR devices that determine target range and speed from the time-of-flight of laser pulses. A LIDAR device measures distances (ranging) by illuminating the target with laser light (light signals) and measuring the reflection with a sensor. Differences in laser return times and wavelengths can then be used to make digital 3-D representations of the target. It has terrestrial, airborne, and mobile applications. The LIDAR device 200 may rotate while sending light signals that get reflected by the object. The LIDAR device 200 may estimate a distance of the object based on these light signals. The LIDAR device 200 may comprise one or more lasers (transmitters) that emit light signals while the LIDAR device rotates at a certain rate and one or more receivers that detect the reflections of the light signals.

It is understood that the above descriptions are for purposes of illustration and are not meant to be limiting.

Figure 3:
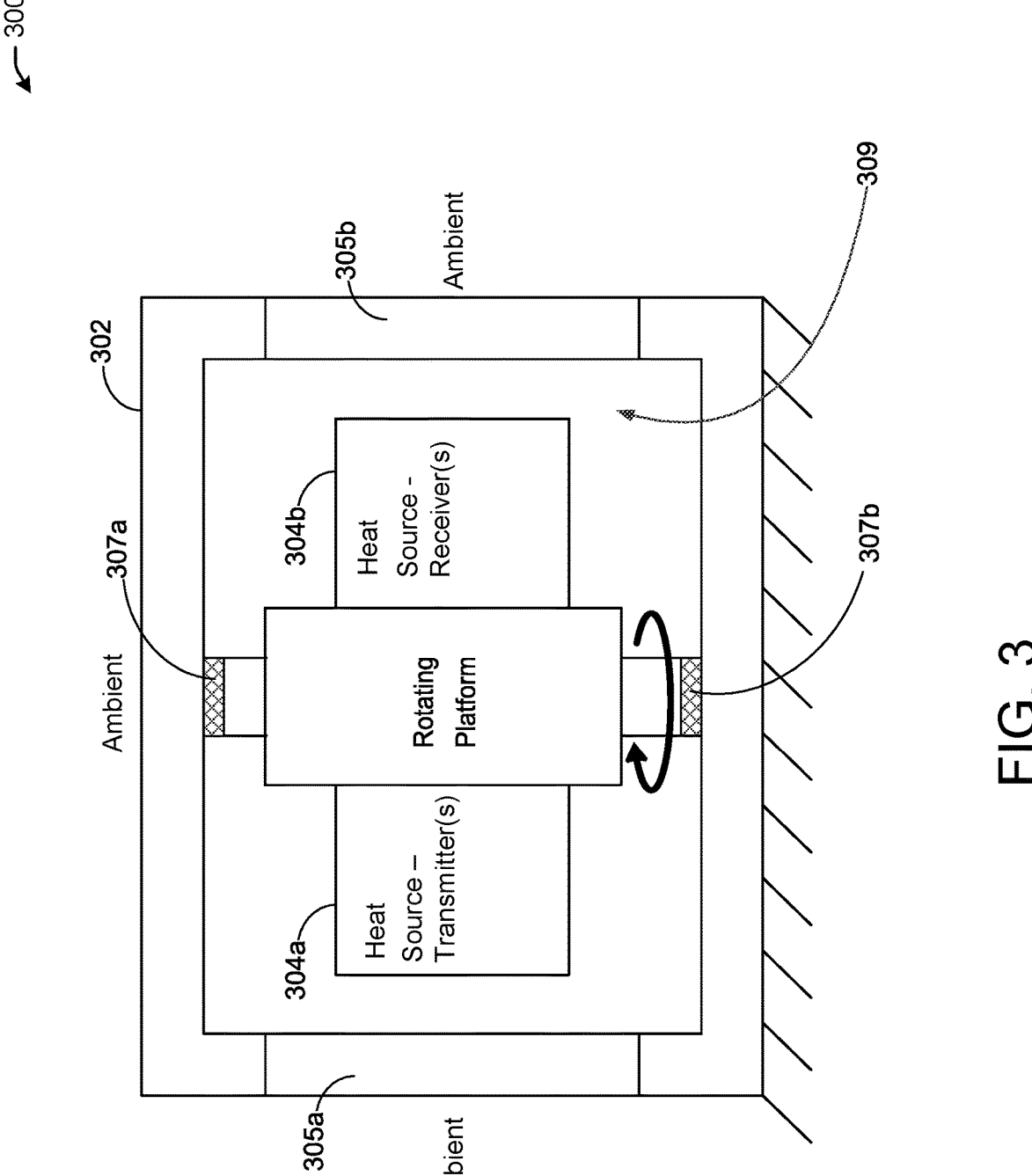
FIG. 3 depicts an illustrative schematic diagram for an improved heat transfer LIDAR device, in accordance with one or more example embodiments of the present disclosure.

FIG. 3 depicts an illustrative schematic diagram for improved heat transfer LIDAR device, in accordance with one or more example embodiments of the present disclosure.

Referring to FIG. 3, there is shown a LIDAR device 300 that is comprised of a housing 302 that has a plurality of surfaces that divide the interior of the LIDAR device 300 from the exterior. The plurality of walls may include one or more windows (e.g., windows 305a and 305b) that permit light signals to exit and enter the LIDAR device 300. Rotating LIDAR solutions, such as LIDAR device 300, may require a low friction bearing (e.g., bearings 307a and 307b) in order to maintain angular velocity and thus azimuthal location accuracy. The low friction bearings may require minimal contact area in order to minimize rotational resistance. The increasing number of transmitter and receiver requirements on the rotating platform results in an increased amount of heat generated that is difficult to remove through the low contact area of bearings 307a and 307b. Heat is often transferred to the gas 309 between the heat source and the housing 302 and the windows 305a and 305b, which is typically air. Since air has a poor thermal conductor, it results in a minimal rate of heat transfer from the heat sources (e.g., transmitter(s) 304a and receiver(s) 304b). A typical heat path may be from the heat sources that may conduct through the air, which then may conduct from the air to the housing 302 and the windows 305a and 305b, then exiting the LIDAR device 300 to get to the ambient environment outside the LIDAR device 300.

In one or more embodiments, the LIDAR device 300 may enclose within its housing helium instead of air in order to increase the thermal conductivity between the heat sources and the housing in order to radiate heat output of the LIDAR device 300. Helium gas is a good replacement for air as a thermal conductor for several reasons. For example, Helium has a high rate of heat transfer compared to other gasses. Also, Helium has 0.151 Watts per meter per degree Kelvin (W/m K) as opposed to 0.026 for air (at 300 Kelvin). This results in approximately of 7 times increase. Helium also has approximately a 25% higher heat transfer coefficient (at 300K) than air. The value of thermal conductivity for most gases and vapors ranges between 0.01 and 0.03 W/mK at room temperature. Notable exceptions are Helium (0.15) and Hydrogen (0.18). See Table 1 below.

TABLE 1

| Gas | Thermal Conductivity at 300 K (W/mK) |
| --- | --- |
| Air | 0.026 |
| Ar | 0.018 |

TABLE 1-continued

| Gas | Thermal Conductivity at 300 K (W/mK) |
| --- | --- |
| CO | 0.025 |
| $CO_2$ | 0.017 |
| H | 0.182 |
| He | 0.151 |
| N2 | 0.026 |
| Ne | 0.049 |
| O2 | 0.027 |

In one or more embodiments, the gas that may be used inside the housing 302 may be selected to have a better heat conductivity than the air inside the housing 302. In some embodiments, a mixture of gases may be used to replace the air within the housing 302. This mixture may be based on a ratio that results in one or more benefits. For example, a benefit may be to increase the thermal conductivity from the heat sources within the LIDAR device 300 to the exterior of the LIDAR device 300. Another benefit may be to increase optical clarity such that the light signals that are being transmitted from a transmitter (e.g., a laser) through the lens on the LIDAR enclosure may result in better optical clarity on both the transmitter side and the receiver side. Another benefit may be that a second gas may be used to make a first gas less reactive within the enclosure. For example, hydrogen may be used with or without helium in a pure or a molecular form in the enclosure but because hydrogen is reactive, it may be beneficial to introduce a second gas in order to make hydrogen within the enclosure to be less reactive.

In one or more embodiments, only helium may be used inside the LIDAR device 300. However, in some scenarios, impurities may be present with helium. Therefore, indicating that only helium is used inside the LIDAR enclosure may result in a percentage of the helium gas within the enclosure to be approximately 100 percent but due to impurities that may be present, that percentage is approximated. In cases where helium can be pure, the LIDAR device 300 may have Helium as the gas within the housing 302. It should be understood that although helium, hydrogen, and/or impurities, may be present, all of these may be classified as gases. That is having Helium with some impurities may be considered as having a first gas and a second gas in the mixture. These gases may be used as a mixture within the LIDAR enclosure, other percentages and ratios of one or more gases may be used within the LIDAR enclosure in order to increase the heat conductivity within the mixture to allow heat to transfer from the heat source through the mixture to reach the walls of the LIDAR enclosure before radiating to the outside of the LIDAR enclosure.

In one or more embodiments, the LIDAR device 300 may include hydrogen as a gas within the housing 302. Hydrogen has a better heat transfer than helium, as seen in Table 1 above. However, hydrogen is highly reactive, while helium is a noble gas making it non-reactive. Being non-reactive, helium is less corrosive to sensors within the LIDAR device 300. Further, helium is commercially available and relatively easy to acquire. However, helium requires a better sealing compared to air. This is because helium's molecules are smaller and can easily escape especially at elevated temperatures, which caused pressures to increase due to thermal expansion. Therefore, the housing 302 may be formed in a manner to minimize and/or remove all seepage in order to allow helium to be used as a gas within the housing 302. However, as explained above, in some scenarios, another gas may be used in the mixture of gases within the housing 302, which may slow down the seepage of helium gas under certain conditions.

It is understood that the above descriptions are for purposes of illustration and are not meant to be limiting.

Figure 4:
FIG. 4 depicts an illustrative schematic diagram for an improved heat transfer LIDAR device, in accordance with one or more example embodiments of the present disclosure.

FIG. 4 depicts an illustrative schematic diagram for an improved heat transfer LIDAR device, in accordance with one or more example embodiments of the present disclosure.

Referring to FIG. 4, there is shown a LIDAR device 400. The LIDAR device 400 may be equivalent to the LIDAR device 300 of FIG. 3.

In one or more embodiments, the LIDAR device 400 may have a mechanism to replace the air inside the LIDAR housing 402 with one or more gases. For example, the LIDAR housing 402 may include an intake valve 425a that is used to pump, for example, helium or other gases into the LIDAR housing 402. The LIDAR housing 402 may also have a relief valve 425b that May allow air to exit while helium or other gases are injected through the intake valve 425a. The intake valve 425a and the relief valve 425b are shown to be on the lower portion of the LIDAR device 400. However, other locations of these valves may be used and it is not necessary to have both of them on the same wall. Further, having the intake valve for 25a on the lower portion of the LIDAR housing 402 is beneficial when helium is used as a gas to fill in the interior portion of the LIDAR device 400 because helium arises due to being lighter than air, which causes it to push the air down towards the release valve 425b. In the case of helium gas, the intake 425a may be higher than the relief valve 425b and the internal structure of the enclosure may be designed to minimize pockets that could capture air as the helium is filled.

In one or more embodiments, the LIDAR device 400 may include one or more sensors (e.g., sensors 423a and 423b) configured to measure and monitor the conditions within the LIDAR enclosure. Some of these sensors may measure and monitor the pressure within the LIDAR enclosure. For example, monitoring the pressure within the LIDAR enclosure may determine whether the concentration of the various gases has changed over time due to leakage. Although the LIDAR enclosure is built to ensure minimal to no leakage occurs, there may be situations where some leaking occurs over time. In that case, it may be beneficial to monitor the gas within the LIDAR enclosure to ensure the mixture is still operating two have a high thermal conductivity compared to pressure threshold, volume threshold, concentration thresholds, etc. It is understood that the above descriptions are for purposes of illustration and are not meant to be limiting.

It is understood that the above descriptions are for purposes of illustration and are not meant to be limiting.

Figure 5:
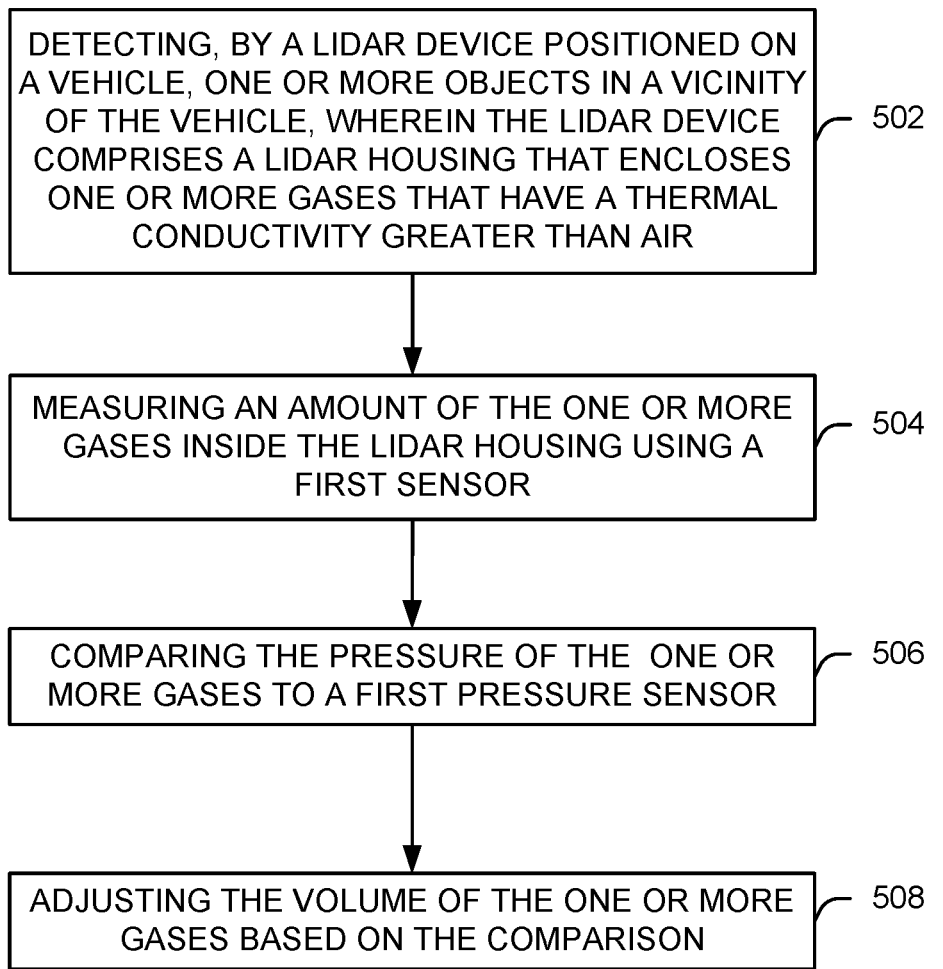
FIG. 5 illustrates a flow diagram of a process for an improved heat transfer LIDAR system, in accordance with one or more example embodiments of the present disclosure.

FIG. 5 illustrates a flow diagram of process 500 for an improved heat transfer LIDAR device, in accordance with one or more example embodiments of the present disclosure.

At block 502, a LIDAR device may detect one or more objects in a vicinity of the vehicle, wherein the LIDAR device comprises a LIDAR housing that encloses one or more gases that have a thermal conductivity greater than air.

At block 504, the LIDAR device may measure an amount of the one or more gases inside the LIDAR housing using a first sensor.

At block 506, the LIDAR device may compare the pressure of the one or more gases to a first pressure sensor.

At block 508, the LIDAR device may adjust the volume of the one or more gases based on the comparison In some embodiments, the LIDAR system may determine a status of the one or more gases located with the LIDAR enclosure based on a pressure of the one or more gases or a concentration of the one or more gases. In one or more embodiments, the pressure within LIDAR enclosure may be measured and compared to a pressure threshold. For example, if the measured pressure is below the pressure threshold, this may indicate that some of the one or more gases has escaped the LIDAR enclosure. In that case, a mechanism may be used to add additional gas to the LIDAR enclosure to bring the pressure to a point that it is equal to or exceeds the pressure threshold. However if the measured pressure is equal to or greater than the pressure threshold, then no need for additional gas. This also may apply to a temperature threshold such that the temperature may be measured inside the LIDAR enclosure to determine whether the measured temperature is below or above a temperature threshold.

It is understood that the above descriptions are for purposes of illustration and are not meant to be limiting.

Figure 6:
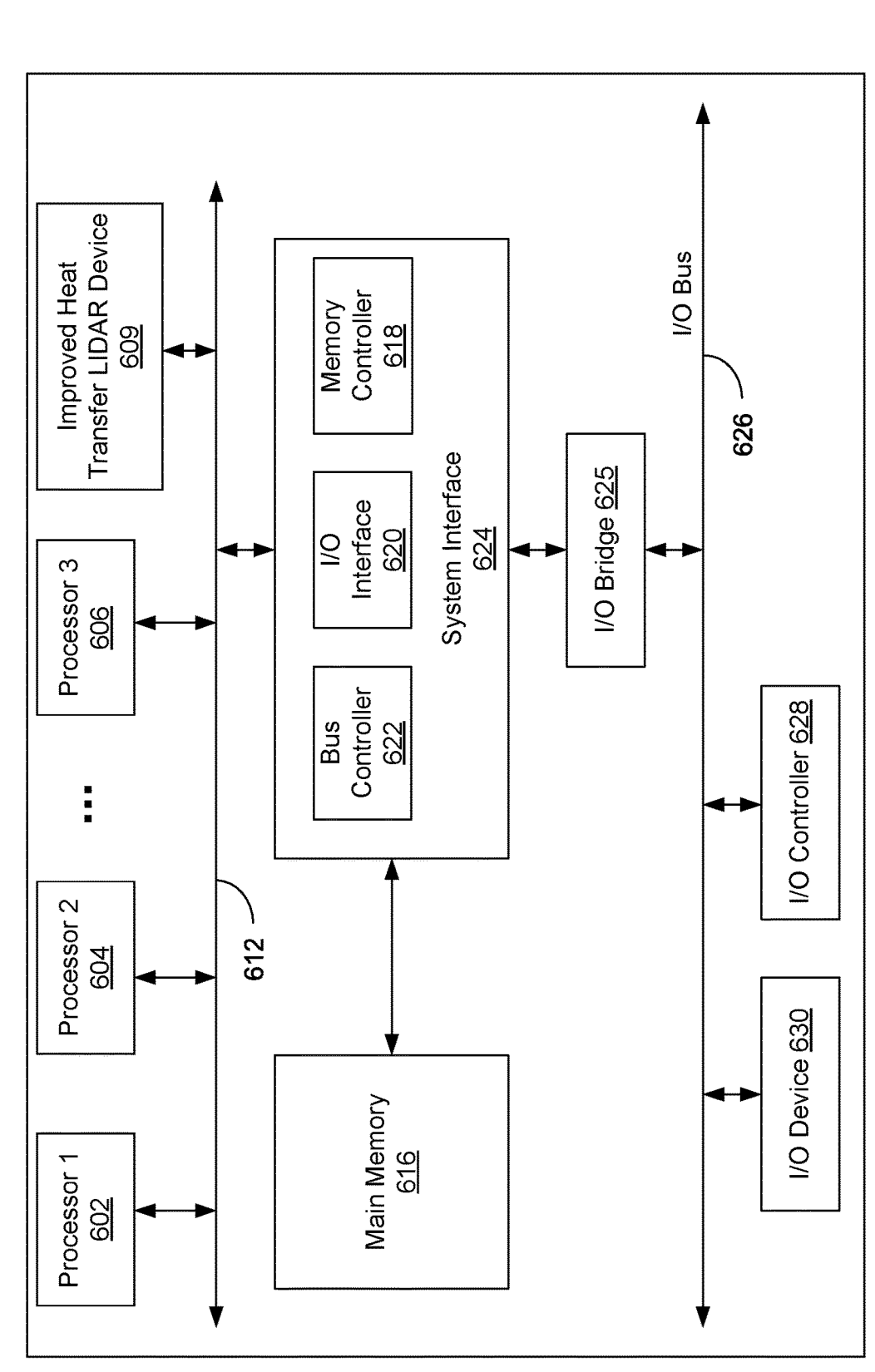
FIG. 6 is a block diagram illustrating an example of a computing device or computer system upon which any of one or more techniques (e.g., methods) may be performed, in accordance with one or more example embodiments of the present disclosure.

FIG. 6 is a block diagram illustrating an example of a computing device or computer system 600 upon which any of one or more techniques (e.g., methods) may be performed, in accordance with one or more example embodiments of the present disclosure.

For example, the computing system 600 of FIG. 6 may represent one or more processors 132 of FIG. 1 and/or the computer system 420 of FIG. 4. The computer system (system) includes one or more processors 602-606. Processors 602-606 may include one or more internal levels of cache (not shown) and a bus controller (e.g., a bus controller 622) or bus interface (e.g., I/O interface 620) unit to direct interaction with the processor bus 612. An improved heat transfer LIDAR device 609 may also be in communication with the Processors 602-606 and may be connected to the processor bus 612.

Processor bus 612, also known as the host bus or the front side bus, may be used to couple the processors 602-606 and/or the computer system 420 and/or sensors 423a and 423b with the system interface 624. System interface 624 may be connected to the processor bus 612 to interface other components of the system 600 with the processor bus 612. For example, system interface 624 may include a memory controller 618 for interfacing a main memory 616 with the processor bus 612. The main memory 616 typically includes one or more memory cards and a control circuit (not shown). System interface 624 may also include an input/output (I/O) interface 620 to interface one or more I/O bridges 625 or I/O devices 630 with the processor bus 612. One or more I/O controllers and/or I/O devices may be connected with the I/O bus 626, such as I/O controller 628 and I/O device 630, as illustrated.

I/O device 630 may also include an input device (not shown), such as an alphanumeric input device, including alphanumeric and other keys for communicating information and/or command selections to the processors 602-606 and/or the improved heat transfer LIDAR device 609. Another type of user input device includes cursor control, such as a mouse, a trackball, or cursor direction keys for communicating direction information and command selections to the processors 602-606 and/or the improved heat transfer LIDAR device 609 and for controlling cursor movement on the display device.

System 600 may include a dynamic storage device, referred to as main memory 616, or a random access memory (RAM) or other computer-readable devices coupled to the processor bus 612 for storing information and instructions to be executed by the processors 602-606 and/or the improved heat transfer LIDAR device 609. Main memory 616 also may be used for storing temporary variables or other intermediate information during execution of instructions by the processors 602-606 and/or the improved heat transfer LIDAR device 609. System 600 may include read-only memory (ROM) and/or other static storage device coupled to the processor bus 612 for storing static information and instructions for the processors 602-606 and/or the improved heat transfer LIDAR device 609. The system outlined in FIG. 6 is but one possible example of a computer system that may employ or be configured in accordance with aspects of the present disclosure.

According to one embodiment, the above techniques may be performed by computer system 600 in response to processor 604 executing one or more sequences of one or more instructions contained in main memory 616. These instructions may be read into main memory 616 from another machine-readable medium, such as a storage device. Execution of the sequences of instructions contained in main memory 616 may cause processors 602-606 and/or the improved heat transfer LIDAR device 609 to perform the process steps described herein. In alternative embodiments, circuitry may be used in place of or in combination with the software instructions. Thus, embodiments of the present disclosure may include both hardware and software components.

Various embodiments may be implemented fully or partially in software and/or firmware. This software and/or firmware may take the form of instructions contained in or on a non-transitory computer-readable storage medium. Those instructions may then be read and executed by one or more processors to enable the performance of the operations described herein. The instructions may be in any suitable form, such as, but not limited to, source code, compiled code, interpreted code, executable code, static code, dynamic code, and the like. Such a computer-readable medium may include any tangible non-transitory medium for storing information in a form readable by one or more computers, such as but not limited to read-only memory (ROM); random access memory (RAM); magnetic disk storage media; optical storage media; a flash memory, etc.

A machine-readable medium includes any mechanism for storing or transmitting information in a form (e.g., software, processing application) readable by a machine (e.g., a computer). Such media may take the form of, but is not limited to, non-volatile media and volatile media and may include removable data storage media, non-removable data storage media, and/or external storage devices made available via a wired or wireless network architecture with such computer program products, including one or more database management products, web server products, application server products, and/or other additional software components. Examples of removable data storage media include Compact Disc Read-Only Memory (CD-ROM), Digital Versatile Disc Read-Only Memory (DVD-ROM), magneto-optical disks, flash drives, and the like. Examples of non-removable data storage media include internal magnetic hard disks, SSDs, and the like. The one or more memory devices 606 (not shown) may include volatile memory (e.g., dynamic random access memory (DRAM), static random access memory (SRAM), etc.) and/or non-volatile memory (e.g., read-only memory (ROM), flash memory, etc.).

Computer program products containing mechanisms to effectuate the systems and methods in accordance with the presently described technology may reside in main memory 616, which may be referred to as machine-readable media. It will be appreciated that machine-readable media may include any tangible non-transitory medium that is capable of storing or encoding instructions to perform any one or more of the operations of the present disclosure for execution by a machine or that is capable of storing or encoding data structures and/or modules utilized by or associated with such instructions. Machine-readable media may include a single medium or multiple media (e.g., a centralized or distributed database, and/or associated caches and servers) that store the one or more executable instructions or data structures.

Embodiments of the present disclosure include various steps, which are described in this specification. The steps may be performed by hardware components or may be embodied in machine-executable instructions, which may be used to cause a general-purpose or special-purpose processor programmed with the instructions to perform the steps. Alternatively, the steps may be performed by a combination of hardware, software, and/or firmware.

Various modifications and additions can be made to the exemplary embodiments discussed without departing from the scope of the present invention. For example, while the embodiments described above refer to particular features, the scope of this invention also includes embodiments having different combinations of features and embodiments that do not include all of the described features. Accordingly, the scope of the present invention is intended to embrace all such alternatives, modifications, and variations together with all equivalents thereof.

The operations and processes described and shown above may be carried out or performed in any suitable order as desired in various implementations. Additionally, in certain implementations, at least a portion of the operations may be carried out in parallel. Furthermore, in certain implementations, less than or more than the operations described may be performed.

The word "exemplary" is used herein to mean "serving as an example, instance, or illustration." Any embodiment described herein as "exemplary" is not necessarily to be construed as preferred or advantageous over other embodiments.

As used herein, unless otherwise specified, the use of the ordinal adjectives "first," "second," "third," etc., to describe a common object, merely indicates that different instances of like objects are being referred to and are not intended to imply that the objects so described must be in a given sequence, either temporally, spatially, in ranking, or any other manner.

It is understood that the above descriptions are for purposes of illustration and are not meant to be limiting.

Although specific embodiments of the disclosure have been described, one of ordinary skill in the art will recognize that numerous other modifications and alternative embodiments are within the scope of the disclosure. For example, any of the functionality and/or processing capabilities described with respect to a particular device or component may be performed by any other device or component. Further, while various illustrative implementations and architectures have been described in accordance with embodiments of the disclosure, one of ordinary skill in the art will appreciate that numerous other modifications to the illustrative implementations and architectures described herein are also within the scope of this disclosure.

Although embodiments have been described in language specific to structural features and/or methodological acts, it is to be understood that the disclosure is not necessarily limited to the specific features or acts described. Rather, the specific features and acts are disclosed as illustrative forms of implementing the embodiments. Conditional language, such as, among others, "can," "could," "might," or "may,"

unless specifically stated otherwise, or otherwise understood within the context as used, is generally intended to convey that certain embodiments could include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without user input or prompting, whether these features, elements, and/or steps are included or are to be performed in any particular embodiment.

What is claimed is:

1. A light detection and ranging (LIDAR) device comprising:

a LIDAR housing configured to attach to a vehicle to detect one or more objects in a field of view of the LIDAR device, the LIDAR housing having a lower part and an upper part opposing the lower part, wherein the LIDAR housing encloses one or more gases having a thermal conductivity greater than air;

one or more windows allowing light signals to pass through, wherein the one or more windows are attached to one or more walls of the LIDAR housing;

a rotating platform situated inside the LIDAR housing and configured to rotate around a center axis relative to the LIDAR housing;

one or more light signal transmitters configured to transmit first light signals through the one or more windows and disposed on the rotating platform; and one or more light signal receivers configured to detect second light signals reflected by the one or more objects towards the LIDAR device and disposed on the rotating platform, wherein the one or more gases is disposed between the one or more windows and the rotating platform, wherein the one or more windows include a first window and a second window respectively disposed on two walls facing each other in the LIDAR housing, wherein the one or more light signal transmitters and the one or more light signal receivers are arranged on opposing sides of the rotating platform, wherein when the one or more light signal transmitters transmit the first signals through the first window, the one or more light signal receivers detect the second light signals through the second window, wherein the one or more gases is lighter than air such that the one or more gases push air in the LIDAR housing to the lower part of the LIDAR housing, and wherein the LIDAR device further comprises:

a first valve disposed at the lower part of the LIDAR housing and configured to pump the one or more gases into the LIDAR housing; and a second valve disposed at the lower part of the LIDAR housing and configured to discharge the air inside the LIDAR housing while the one or more gases is injected into the LIDAR housing through the first valve.

2. The LIDAR device of claim 1, wherein the one or more gases comprise helium.

3. The LIDAR device of claim 1, wherein the one or more gases comprises a first percentage of a first gas of the one or more gases and a second percentage of a second gas of the one or more gases.

4. The LIDAR device of claim 3, wherein the first gas is hydrogen and wherein the second gas relatively lowers a reactivity of the hydrogen.

5. The LIDAR device of claim 3, wherein a mixture of the first gas and second gas has a heat transfer coefficient greater than a threshold, and wherein the threshold is associated with a thermal conductivity of the LIDAR device.

6. The LIDAR device of claim 1, further comprising a sensor configured to detect a first concentration of a first gas of the one or more gases and a second concentration of a second gas of the one or more gases.

7. The LIDAR device of claim 1, further comprising a sensor to detect a pressure or a temperature of the one or more gases.

8. The LIDAR device of claim 1, wherein the first valve and the second valve act to reduce an amount of air in the LIDAR housing.

9. A vehicle system comprising:

a computer system configured to capture data associated with a detection of one or more objects in the vicinity of the vehicle; and a LIDAR device positioned on the vehicle, wherein the LIDAR device comprises:

a LIDAR housing that encloses one or more gases that have a thermal conductivity greater than air, the LIDAR housing having a lower part and an upper part opposing the lower part, one or more windows allowing light signals to pass through, wherein the one or more windows are attached to one or more walls of the LIDAR housing, a rotating platform situated inside the LIDAR housing and configured to rotate around a center axis relative to the LIDAR housing, one or more light signal transmitters configured to transmit first light signals through the one or more windows and disposed on the rotating platform, and one or more light signal receivers configured to detect second light signals reflected by the one or more objects towards the LIDAR device and disposed on the rotating platform, wherein the one or more gases is disposed between the one or more windows and the rotating platform, wherein the one or more windows include a first window and a second window respectively disposed on two walls facing each other in the LIDAR housing, wherein the one or more light signal transmitters and the one or more light signal receivers are arranged on opposing sides of the rotating platform, wherein when the one or more light signal transmitters transmit the first signals through the first window, the one or more light signal receivers detect the second light signals through the second window, wherein the one or more gases is lighter than air such that the one or more gases push air in the LIDAR housing to the lower part of the LIDAR housing, and wherein the LIDAR device further comprises:

a first valve disposed at the lower part of the LIDAR housing and configured to pump the one or more gases into the LIDAR housing; and a second valve disposed at the lower part of the LIDAR housing and configured to discharge the air inside the LIDAR housing while the one or more gases is injected into the LIDAR housing through the first valve.

10. The vehicle system of claim 9, wherein the one or more gases inside the LIDAR housing comprise helium.

11. The vehicle system of claim 9, wherein the one or more gases inside the LIDAR housing comprises a first percentage of a first gas of the one or more gases and a second percentage of a second gas of the one or more gases.

12. The vehicle system of claim 11, wherein the first gas inside the LIDAR housing is hydrogen and wherein the second gas inside the LIDAR housing relatively lowers a reactivity of the hydrogen.

13. The vehicle system of claim 11, wherein a mixture of the first gas and second gas inside the LIDAR housing has a heat transfer coefficient greater than a threshold, and wherein the threshold is associated with a thermal conductivity of the LIDAR device.

14. The vehicle system of claim 9, further comprising a sensor configured to detect a first concentration of a first gas of the one or more gases inside the LIDAR housing and a second concentration of a second gas of the one or more gases inside the LIDAR housing.

15. The vehicle system of claim 9, further comprising a sensor to detect a pressure of the one or more gases inside the LIDAR housing.

16. A method comprising:

measuring an amount of one or more gases inside a LIDAR housing of a LIDAR device positioned on a vehicle using a first sensor, the LIDAR housing having a lower part and an upper part opposing the lower part, wherein the one or more gases has a thermal conductivity greater than air;

comparing a pressure of the one or more gases to a pressure threshold; and adjusting the pressure of the one or more gases based on the comparison, wherein the LIDAR housing is configured to attach to the vehicle to detect one or more objects in a field of view of the LIDAR device, wherein the LIDAR device comprises:

one or more windows allowing light signals to pass through, wherein the one or more windows are attached to one or more walls of the LIDAR housing;

a rotating platform situated inside the LIDAR housing and configured to rotate around a center axis relative to the LIDAR housing;

one or more light signal transmitters configured to transmit first light signals through the one or more windows and disposed on the rotating platform; and one or more light signal receivers configured to detect second light signals reflected by the one or more objects towards the LIDAR device and disposed on the rotating platform, wherein the one or more gases is disposed between the one or more windows and the rotating platform, wherein the one or more windows include a first window and a second window respectively disposed on two walls facing each other in the LIDAR housing, wherein the one or more light signal transmitters and the one or more light signal receivers are arranged on opposing sides of the rotating platform, wherein when the one or more light signal transmitters transmit the first signals through the first window, the one or more light signal receivers detect the second light signals through the second window, wherein the one or more gases is lighter than air such that the one or more gases push air in the LIDAR housing to the lower part of the LIDAR housing, and wherein the LIDAR device further comprises:

a first valve disposed at the lower part of the LIDAR housing and configured to pump the one or more gases into the LIDAR housing; and a second valve disposed at the lower part of the LIDAR housing and configured to discharge the air inside the LIDAR housing while the one or more gases is injected into the LIDAR housing through the first valve.

17. The method of claim 16, wherein the amount of the one or more gases is based on a pressure or temperature of the one or more gases.

18. The method of claim 16, wherein the one or more gases inside the LIDAR housing comprise helium.

19. The method of claim 16, wherein the one or more gases inside the LIDAR housing comprises a first percentage of a first gas of the one or more gases and a second percentage of a second gas of the one or more gases.

20. The method of claim 19, wherein the first gas is hydrogen and wherein the second gas relatively lowers a reactivity of the hydrogen.

21. The method of claim 19, wherein a mixture of the first gas and second gas has a heat transfer coefficient greater than a threshold, wherein the threshold is associated with a thermal conductivity of the LIDAR device.

* * * * *